C. H. FULSON.
COOKER FOR SEEDS.
APPLICATION FILED DEC. 5, 1913.
1,104,981.
Patented July 28, 1914.
2 SHEETS—SHEET 1.
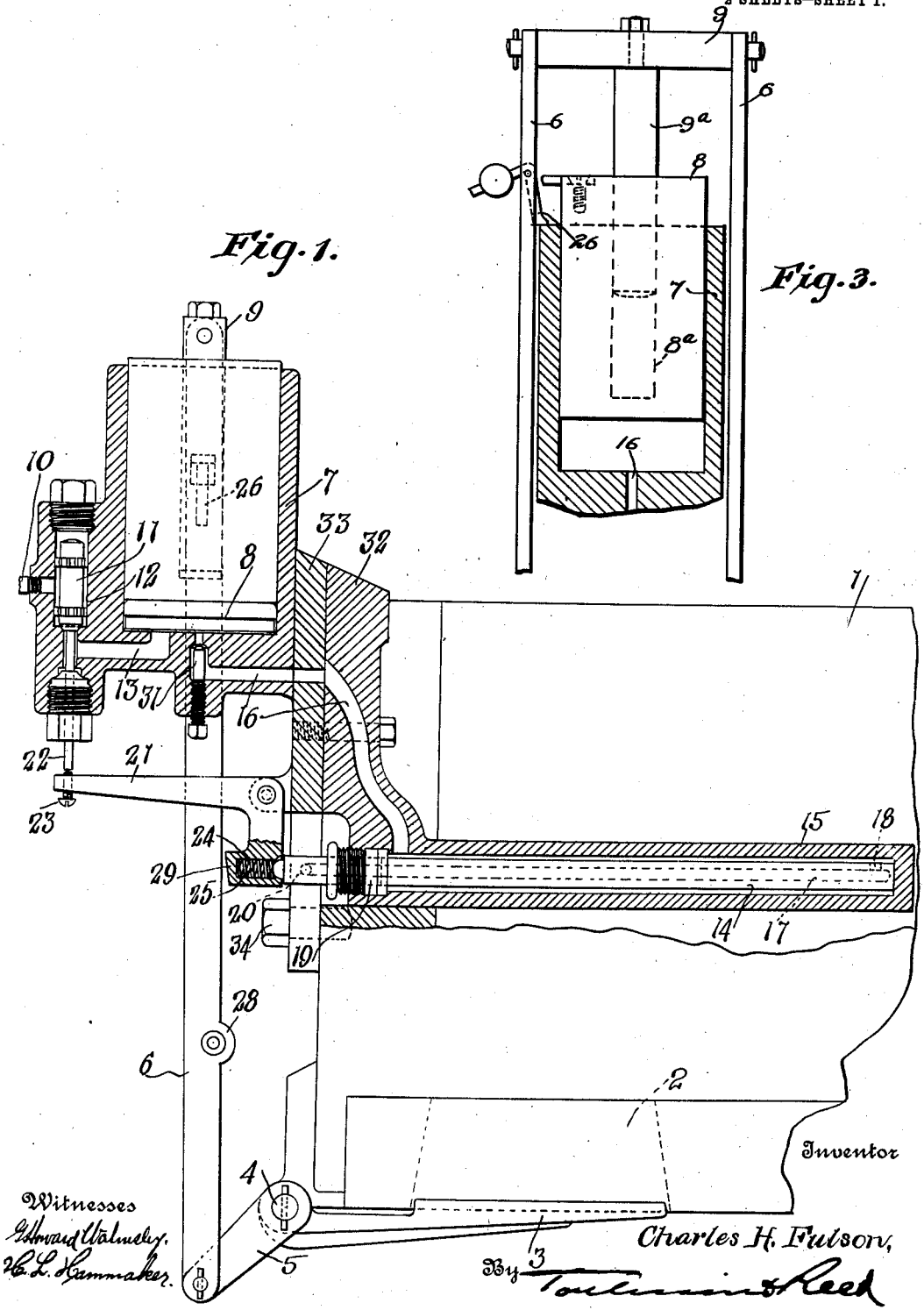
Charles H. Fulson,

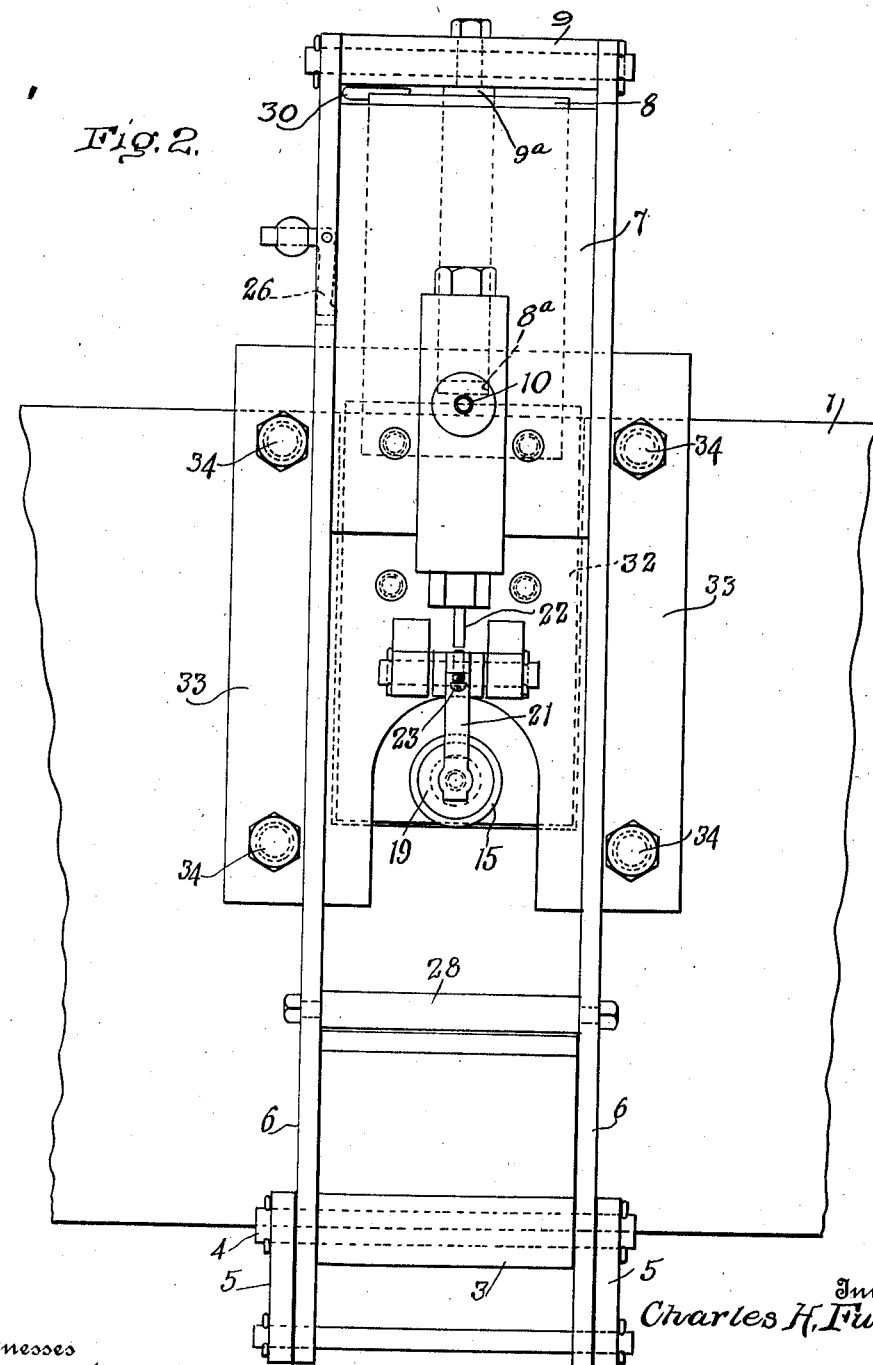

UNITED STATES PATENT OFFICE.

CHARLES HIRAM FULSON, OF ATLANTA, GEORGIA, ASSIGNOR TO BUCKEYE IRON AND BRASS WORKS, OF DAYTON, OHIO, A CORPORATION OF OHIO.

COOKER FOR SEEDS.

1,104,981.　　　　　Specification of Letters Patent.　　Patented July 28, 1914.

Application filed December 5, 1913. Serial No. 804,805.

*To all whom it may concern:*

Be it known that I, CHARLES H. FULSON, a citizen of the United States, residing at Atlanta, in the county of Fulton and State of Georgia, have invented certain new and useful Improvements in Cookers for Seeds, of which the following is a specification, reference being had therein to the accompanying drawing.

This invention relates to cookers for seeds, such as cotton seeds, preparatory to the extracting of the oil from the seeds.

The object of the invention is to provide means for automatically discharging the contents of the cooker, or one compartment thereof, when the seeds or "meats" in that compartment have been cooked, that is, properly prepared for the extraction of the oil therefrom. The cooking of the meats is wholly a matter of temperature. As soon as the temperature reaches the proper point the cooking is finished. This temperature does not have to be maintained for any period of time.

It is, therefore, a further object of my invention to provide mechanism controlled by the temperature of the meats within a compartment of the cooker to automatically discharge the meats therefrom when the temperature has reached a predetermined degree.

It is a further object of the invention to provide such a mechanism which will be wholly automatic both in the opening and the closing of the discharge opening; and further, to provide means whereby the discharge opening may be maintained in an open condition for a length of time sufficient to permit the discharge of all the meats within the compartment.

A further object of the invention is to produce a device of this kind which will be very simple in its construction and both simple and positive in its operation.

In the accompanying drawings, Figure 1 is a sectional view showing a portion of one of the compartments of a cooker, of the type employed for cooking cotton seeds preparatory to extracting the oil therefrom, with my invention applied thereto; Fig. 2 is an elevation of the invention looking toward the cooker; and Fig. 3 is a sectional view of the piston and cylinder and their coöperating devices.

In these drawings I have illustrated one embodiment of the invention and have shown the same as applied to a cotton seed cooker of a well known type but it will be understood that the invention is applicable to cookers or heaters of various kinds and that the mechanism here shown is for the purpose of illustration only.

The invention consists broadly in providing a power-operated device for controlling the discharge opening of the cooker with a thermostatic device for controlling the application of power to said power-operated device. The thermostatic device, which may be of any suitable character, is supported in such a position that it will be subjected to substantially the same heat to which the meats within the cooker are subjected and when this heat reaches a predetermined degree the expansion of the thermostatic device will cause the closure of the discharge opening to be moved into its open position.

In the particular embodiment of the invention shown in the drawings a portion of the cooker, which may consist of one or a plurality of compartments, is shown at 1 and is provided with a discharge opening 2 having a closure 3 hinged to the side wall of the cooker, as shown at 4. Rigidly connected with the closure 3 are arms 5. A suitable connecting device, here shown as comprising rods 6, is secured to the outer ends of the arms 5 and connects the same with a power-operated actuating device, which, in the present instance, consists of a fluid cylinder 7 having therein a piston 8 which is slidably connected with a cross head 9 secured between the upper ends of the rods 6. The fluid cylinder 7 is connected at a point below the lowermost position of the piston 8 with a fluid supply pipe 10 and a suitable controlling valve is interposed between the pipe 10 and the cylinder. In the present instance this controlling device is in the form of a balanced valve 11 mounted in a valve chamber 12 connected by a conduit 13 with the bottom of the cylinder 7. The construction of the valve 11 is such that the valve will be substantially balanced but that there will be an excess of pressure in a direction to hold the valve seated and this pressure combined with the weight of the valve will hold the same normally on its seat and in a position to control the flow of fluid from the supply pipe to the cylinder. The opening of this valve is controlled by the temperature within the cooker 1 and, to this end, a suitable thermostatic device is inserted within the cooker and connected with the valve. In the present instance this thermostatic device is in the form of a suitable metallic bar 14 formed of any material, or combination of materials which has a high degree of expansion and is readily affected by heat. This bar is mounted in a casing 15 and projects radially, or substantially radially, into the cooker at a point preferably somewhat below the normal level of the meats within the cooker but above the agitators which revolve within the cooker and which facilitate the discharge of the meats therefrom when the discharge gate 3 is open. This agitator is of a well known construction and is not here illustrated, as it does not form a part of the present invention.

Means are also provided for cooling the thermostatic bar to contract the same and thus release the valve-actuating devices to permit the valve to close. In the present instance the chamber within the casing 15 in which the bar 14 is mounted is somewhat larger in diameter than the bar and is connected by a conduit 16 with the cylinder 7 and the bar itself has a longitudinal conduit 17 connected at one end by means of a port 18 with the interior of the casing 15. The bar 14 extends through a suitable packing nut 19, or is otherwise constructed to provide a tight joint, and has at its outer portion a discharge port 20 through which the fluid entering the conduit 17 may be discharged. Pivotally mounted on a fixed support adjacent to the outer end of the bar 14 is a bell crank lever 21, the lower arm of which is arranged adjacent to and in the path of the outer end of the expansible bar 14, while the outer end is arranged in alinement with a stem 22 connected with the valve 12. Preferably, a set screw 23 is mounted in the end of the arm to enable the same to be adjusted with relation to the valve stem. In order that the valve may be quickly and positively moved to a position to throw open the port leading to the cylinder I prefer to provide a spring for completing the movement of the valve as soon as the same has been unseated by the expansion of the rod 14. For this purpose I have provided that arm of the bell crank lever 21, which is adjacent to the expansible rod 14, with a socket 24 having therein a spring 25 which bears against the end of the rod 14. The end of the bar 14 is of a diameter greater than the socket in which the spring is mounted and when the spring has been compressed into the socket the end of the bar will bear against the edges of the socket so as to form a rigid connection between the arm of the lever 21 and the expansible bar. The tension of the spring 25, is insufficient to overcome the pressure exerted upon the valve and tending to hold the same in its closed position but as soon as the expansion of the bar 14 has, through its direct connection with the lever 21, unseated the valve 11 and thus relieved the pressure thereon, the spring 25 will expand and move the valve to its full open position independently of any further movement on the part of the expansible bar or thermostat. The fluid in the pipe 10 will then enter the cylinder 7 beneath the piston 8, and elevate the latter, carrying with it the connecting devices 6 and moving the gate or closure 3 to its open position. The slidable connection between the piston and the cross head 9 is of such a character that the upward movement of the piston will cause the cross head to move with it but will permit the piston to move downward independently of the cross head if the latter be locked in its uppermost position. In the present embodiment of the invention the piston is provided with a central longitudinal guideway 8$^a$ in which is slidably mounted a rod or plunger 9$^a$ connected at its upper end with the cross head 9. A latch 26 is pivotally mounted on one of the connecting members 6 and is counterweighted to cause its nose to move inward. As the connecting members move upward this nose rides over the wall of the cylinder and when the cross head is in its uppermost position the toe of the latch will have passed the upper end of the cylinder and will have swung into position to engage the upper edge thereof and retain the cross head in its uppermost position, thus holding the gate or closure 3 in its open position. As soon as the water or other fluid enters the cylinder 7 a portion of it will pass out through the conduit 16 into the casing 15 of the thermostat and out through the conduits 17, thus quickly cooling the expansible bar and contracting the same to its normal position to allow the lever 21 and the valve 11 to return to their normal positions. Means are also preferably provided to positively return the valve-actuating lever 21 to its normal position. In the present instance the upward movement of the piston and the connecting devices serve also to cause a cross bar 28 carried by the connecting device near its lower end to engage the bell crank lever 21 and move the same toward its normal position, the lower arm of the bell crank lever having preferably an inclined edge 29 arranged to be engaged by the cross bar 28. As soon as the pressure on the lever 21 has been relieved, the weight of the valve 11 will cause it to descend and seat itself, thus cutting off the flow of water to the cylinder. After the cylinder has been cut off from its source of fluid supply the fluid will continue to escape through the port 16 and the piston will descend. During the descent of the piston, however, the closure or gate 3 is held open by the latch 26. Means are provided whereby as the piston approaches its lowermost position the connecting device 6 will be released and the gate 3 closed, this being accomplished, in the present instance, by a trip device 30 carried by the upper end of the piston and arranged to engage the latch 26 and disengage the same from the fixed part which serves to hold the connecting device in its uppermost position.

The weight of the connecting device and the parts carried thereby will ordinarily be sufficient to close the gate 3 and retain the same closed, but if desirable additional weight may be applied thereto. The flow of fluid through the port 16 is so timed as to cause the descent of the piston 8 to occupy a sufficient amount of time to permit all the meats to be discharged from the cooker and in order that the timing of the piston may be regulated an adjustable valve, such as the screw valve 31, is provided to regulate the flow of fluid through the conduit 16.

The thermostatic device may be mounted on the cooker in any suitable manner, but, in the present instance, I have formed a recess in the vertical wall of the cooker and have mounted therein a block or casting 32 which carries the casing 15 and is rigidly secured to a plate 33 overlapping the edges of the opening and secured to the wall of the cooker by bolts or screws 34. This plate 33 is rigidly secured to and, if desired, may be formed integral with the cylinder 7 and the connection between the block 32 and the plate 33 is such as to form a tight joint between the two parts of the conduit 16.

The operation of the mechanism has been fully described in connection with the description of the several parts thereof. Briefly, it is as follows: with the parts in the position shown in Fig. 1 a charge of seeds or other material to be cooked is placed in the cooker 1 and subjected to heat therein. As the heat gradually increases the thermostatic bar expands and when the heat has reached a predetermined temperature, which is sufficient to cook the meats, the expansion will have been such as to have forced the valve 11 from its seat. As soon as the valve 11 is unseated, and the pressure thereon relieved, the spring 25 will completely open the valve and permit the free flow of fluid to the cylinder 7, thereby quickly raising the piston 8 and opening the closure 3. The closure is locked in its open position, in the manner described, and, the thermostat having cooled and contracted, the valve 11 again seats itself, cutting off the flow of fluid to the cylinder and permitting the cylinder to move downward to its normal position. While the piston is moving downward the meal is being discharged through the opening 2 of the cooker and when the piston approaches its lowermost position the latch will be tripped and the connecting arms permitted to move downward and close the gate 3, thereby restoring the parts to the position shown in Fig. 1.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. The combination, with a stationary cooker having a discharge opening, and a hinged closure for said opening, of an actuating device for said closure, means to control the operation of said actuating device, and a thermostat mounted in said cooker and connected with said controlling means.

2. The combination, with a cooker to contain a quantity of meats to be cooked and having a discharge opening, and a closure for said opening, of an actuating device for said closure, means to control the operation of said actuating device, a thermostat carried by the wall of said cooker and projecting into the meats within the same and connected with said controlling means.

3. The combination, with a cooker having a discharge opening, and a closure for said opening, of a fluid-operated device for actuating said closure, a valve to control the operation of said actuating device, and a thermostat mounted in said cooker and connected with said valve to open the same when the heat within said cooker reaches a predetermined degree.

4. The combination, with a cooker having a discharge opening, and a closure for said opening, of a fluid-operated device for actuating said closure, a valve to control the operation of said actuating device, and a thermostat mounted within said cooker and having a part extending beyond the wall thereof, and a lever interposed between the outer end of said thermostat and said valve, whereby the expansion of said thermostat will actuate said lever to unseat said valve.

5. The combination, with a cooker having a discharge opening, and a closure for said opening, of a fluid-operated device for actuating said closure, a valve to control the operation of said actuating device, and a thermostat mounted within said cooker and having a part extending beyond the wall thereof, a lever interposed between the outer end of said thermostat and said valve, whereby the expansion of said thermostat will actuate said lever to unseat said valve, and a spring interposed between said lever and said thermostat and arranged to be compressed by the expansion of said thermostat and to expand after said valve has been unseated, thereby completing the movement of said valve.

6. The combination, with a cooker having a discharge opening, and a closure for said opening, of a fluid-operated device for actuating said closure, a valve to control the operation of said actuating device, a thermostat mounted in said cooker and connected with said valve to open the same when the heat within said cooker reaches a predetermined degree, and means to cause said thermostat to contract after said valve has been opened and said actuating device has been operated.

7. The combination, with a cooker having a discharge opening, and a closure for said opening, of a fluid-operated device for actuating said closure, a valve to control the operation of said actuating device, a thermostat mounted in said cooker and connected with said valve to open the same when the heat within said cooker reaches a predetermined degree, and a connection between said fluid-operated device and said thermostat to subject the latter to the cooling action of the fluid, thereby contracting the same to permit the parts to return to their normal positions.

8. The combination, with a cooker having a discharge opening, and a closure for said opening, of a fluid-operated device to actuate said closure, a valve to control the flow of fluid to said device, a thermostat mounted within said cooker and comprising a hollow casing, and an expansible member mounted therein, a connection between said expansible member and said valve, whereby the expansion of said member will open said valve, and a connection between said hollow casing and said fluid-operated device, whereby a portion of the fluid passing said valve will enter said casing.

9. The combination, with a cooker having a discharge opening, and a closure for said opening, of a fluid-operated device to actuate said closure, a valve to control the flow of fluid to said device, a thermostat mounted in said cooker and comprising a tubular casing closed at both ends and in open communication with said fluid-operated device, an expansible member mounted in said tubular casing and extending through the closed inner end thereof, said expansible member having a conduit communicating with the interior of said casing and having a discharge opening beyond the outer end of said casing, and a connection between said expansible member and said valve.

10. The combination, with a cooker having a discharge opening, and a closure for said opening, of a fluid-operated device to actuate said closure, a valve to control the flow of fluid to said device, a thermostat mounted within said cooker and comprising a hollow casing, and an expansible member mounted therein, a connection between said expansible member and said valve, whereby the expansion of said member will open said valve, a connection between said hollow casing and said fluid-operated device, whereby a portion of the fluid passing said valve will enter said casing, and means to regulate the passage of the fluid from said power-operated device to said hollow casing.

11. The combination, with a cooker having a discharge opening, and a closure for said opening, of an actuating device for said closure, a thermostat to control the operation of said actuating device, and means to retain said closure in its open position for a predetermined period of time.

12. The combination, with a cooker having a discharge opening, and a closure for said opening, of a fluid-operated device comprising a cylinder, a valve to control the flow of fluid to said cylinder, a piston mounted in said cylinder, a connection between said piston and said closure, a thermostat to open said valve, and means to retain said closure in its open position while said piston returns to its normal position.

13. The combination, with a cooker having a discharge opening, and a closure for said opening, of a fluid-operated device comprising a cylinder, a valve to control the flow of fluid to said cylinder, a piston mounted in said cylinder, a connecting device connecting said piston with said closure, a detent to retain said connecting device in its uppermost position, and means carried by said piston to disengage said detent and permit said connecting device and said closure to return to their normal positions.

14. The combination, with a cooker having a discharge opening, and a closure for said opening, of a fluid-operated device comprising a cylinder, a valve to control the flow of fluid to said cylinder, a piston mounted in said cylinder, a connecting device to connect said piston with said closure, a thermostat mounted in said cooker, a lever interposed between said thermostat and said valve, whereby the expansion of said thermostat will open said valve and cause said piston to be actuated, and means carried by said connecting device to return said lever to its normal position to permit said valve to be seated when said piston is moved to its uppermost position.

15. The combination, with a cooker having a discharge opening, and a closure for said opening, of an actuating device for said closure, a thermostat connected with said actuating device to cause said device to open said closure when the heat in said cooker reaches a predetermined degree, and means to cause said thermostat to contract after said actuating device has opened said closure.

In testimony whereof, I affix my signature in presence of two witnesses.

CHARLES HIRAM FULSON.

Witnesses:
BESSIE V. JONES,
JOHN HUNDLESS.